US012693015B1

(12) United States Patent
Binek et al.

(10) Patent No.: US 12,693,015 B1
(45) Date of Patent: Jul. 28, 2026

(54) COMBUSTOR LINER HAVING COOLING RING WITH FIN HAVING SPACE FILLING CURVE

(71) Applicant: RTX Corporation, Farmington, CT (US)

(72) Inventors: Lawrence Binek, Glastonbury, CT (US); Frederick Rosenberger, Marlborough, CT (US); Mark Rohrer, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/373,209

(22) Filed: Oct. 29, 2025

(51) Int. Cl.
| | |
|---|---|
| *F23R 3/00* | (2006.01) |
| *B33Y 80/00* | (2015.01) |
| *F23R 3/50* | (2006.01) |

(52) U.S. Cl.
CPC .............. *F23R 3/005* (2013.01); *B33Y 80/00* (2014.12); *F23R 3/002* (2013.01); *F05D 2260/2214* (2013.01); *F05D 2260/22141* (2013.01); *F23R 3/50* (2013.01); *F23R 2900/03043* (2013.01)

(58) Field of Classification Search
CPC .. F23R 3/002; F23R 3/005; F23R 3/50; F23R 2900/03043; F23R 2900/03045; F05D 2260/2214; F05D 2260/22141
See application file for complete search history.

(56) References Cited

U.S. PATENT DOCUMENTS

| | | | |
|---|---|---|---|
| 7,670,675 B2 | 3/2010 | Heselhaus | |
| 8,793,871 B2 | 8/2014 | Morrison et al. | |
| 10,408,064 B2 * | 9/2019 | Zuniga | F01D 5/186 |
| 10,495,001 B2 * | 12/2019 | Zelina | F02C 7/18 |
| 11,031,312 B2 * | 6/2021 | Poltorak | H05K 7/20154 |
| 11,143,106 B2 * | 10/2021 | Zelina | F01D 9/02 |
| 11,480,337 B2 * | 10/2022 | Prociw | F23R 3/005 |
| 11,543,129 B2 * | 1/2023 | Jones | F23R 3/06 |
| 11,670,564 B2 * | 6/2023 | Poltorak | H05K 7/20154 |
| | | | 165/281 |
| 11,781,485 B2 | 10/2023 | Winkler et al. | |
| 11,788,723 B2 * | 10/2023 | Prociw | F23R 3/343 |
| | | | 60/772 |
| 12,288,731 B2 * | 4/2025 | Poltorak | H01L 23/473 |
| 2004/0036230 A1 * | 2/2004 | Matsuda | F16J 15/0887 |
| | | | 277/632 |
| 2018/0258773 A1 * | 9/2018 | Zuniga | F28F 13/12 |
| 2018/0363555 A1 * | 12/2018 | Zelina | F02C 3/145 |
| 2020/0025379 A1 * | 1/2020 | Jones | F23R 3/06 |

(Continued)

FOREIGN PATENT DOCUMENTS

| | | | | |
|---|---|---|---|---|
| CN | 117889460 A | * | 4/2024 | F23R 3/002 |

*Primary Examiner* — Alain Chau
(74) *Attorney, Agent, or Firm* — Kinney & Lange, P.A.

(57) ABSTRACT

A combustor liner for a gas turbine engine, the combustor liner defining a combustion chamber, includes a curved body and a cooling ring. The curved body includes a closed forward end, an open aft end opposite the forward end, an inner wall, and an outer wall radially outward from the inner wall, the outer wall defining an outer liner wall of the combustor liner. The cooling ring includes a fin that has a space filling curve that is modified such that an outer wall of the cooling ring matches a shape of the inner wall of the curved body. An inner wall of the cooling ring defines an inner liner wall of the combustor liner.

18 Claims, 5 Drawing Sheets

(56)                    References Cited

U.S. PATENT DOCUMENTS

2020/0088101 A1* 3/2020 Zelina ........................ F01D 9/02
2021/0156564 A1* 5/2021 Prociw ................... F23R 3/343
2022/0333777 A1* 10/2022 Prociw ................... F23R 3/002
2024/0035659 A1* 2/2024 Prociw ................... F23R 3/343
2025/0129938 A1* 4/2025 Wakita ................... F23R 3/005

* cited by examiner

COMBUSTOR LINER HAVING COOLING RING WITH FIN HAVING SPACE FILLING CURVE

BACKGROUND

The present disclosure relates generally to combustors, and in particular, to a combustor liner.

Combustors operate in inherently high temperature environments. As such, the combustor liner surrounding the combustion chamber requires cooling for the combustor to function and to maintain the integrity of the combustor liner. Current cooling schemes for a combustor liner can require features that increase complexity, result in higher costs, and introduce risk into the system. An improved combustor liner that does not rely on active cooling would be beneficial.

SUMMARY

A combustor liner for a gas turbine engine, the combustor liner defining a combustion chamber, includes a curved body and a cooling ring. The curved body includes a closed forward end, an open aft end opposite the forward end, an inner wall, and an outer wall radially outward from the inner wall, the outer wall defining an outer liner wall of the combustor liner. The cooling ring includes a fin that has a space filling curve that is modified such that an outer wall of the cooling ring matches a shape of the inner wall of the curved body. An inner wall of the cooling ring defines an inner liner wall of the combustor liner.

A combustor liner for a gas turbine engine, the combustor liner defining a combustion chamber, includes a body defining a combustion chamber and a cooling ring. The body includes an inner wall and an outer wall radially outward from the inner wall. The cooling ring includes a fin, an inlet formed by the fin at an upstream end of the cooling ring, an outlet formed by the fin at a downstream end of the cooling ring opposite the inlet, a channel formed by the fin and extending from the inlet of the cooling ring to the outlet of the cooling ring, an outer wall extending from the inlet to the outlet, and an inner wall radially inward from the outer wall and extending from the inlet to the outlet. The outer wall of the cooling ring matches a shape of the inner wall of the body. The inner wall of the cooling ring defines an inner liner wall of the combustor liner.

DETAILED DESCRIPTION

In general, the present disclosure describes a combustor liner that has a cooling ring at an inner diameter of the combustor liner that comprises a fin having a space filling curve to provide inactive cooling for the combustor liner, which increases the durability of the combustor liner and enables the combustor liner to withstand high temperature environments while being cost-effective.

Figure 1A:
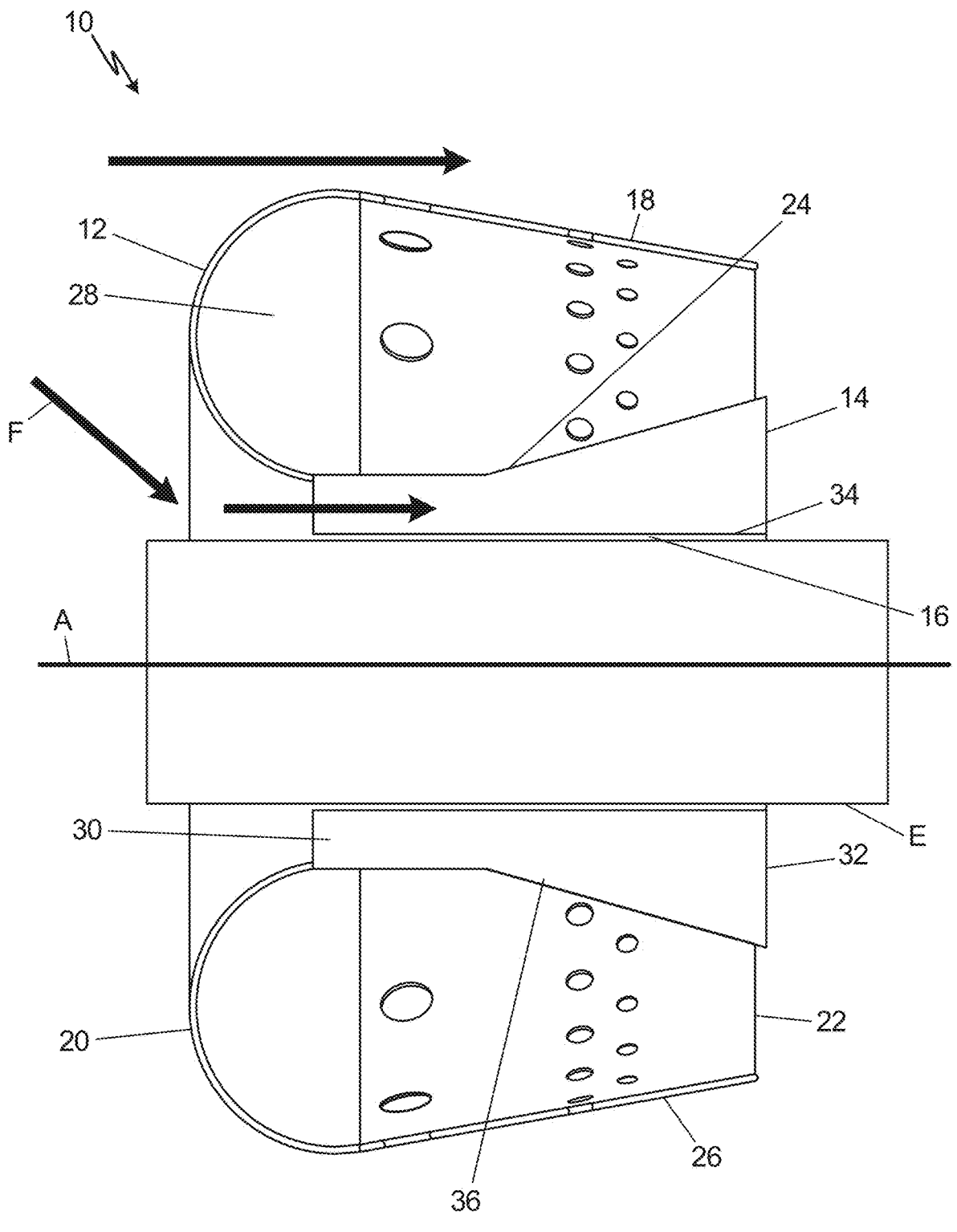
FIG. 1A is a schematic cross-sectional side view of a combustor liner showing a cooling ring and an exhaust duct.
Figure 1B:
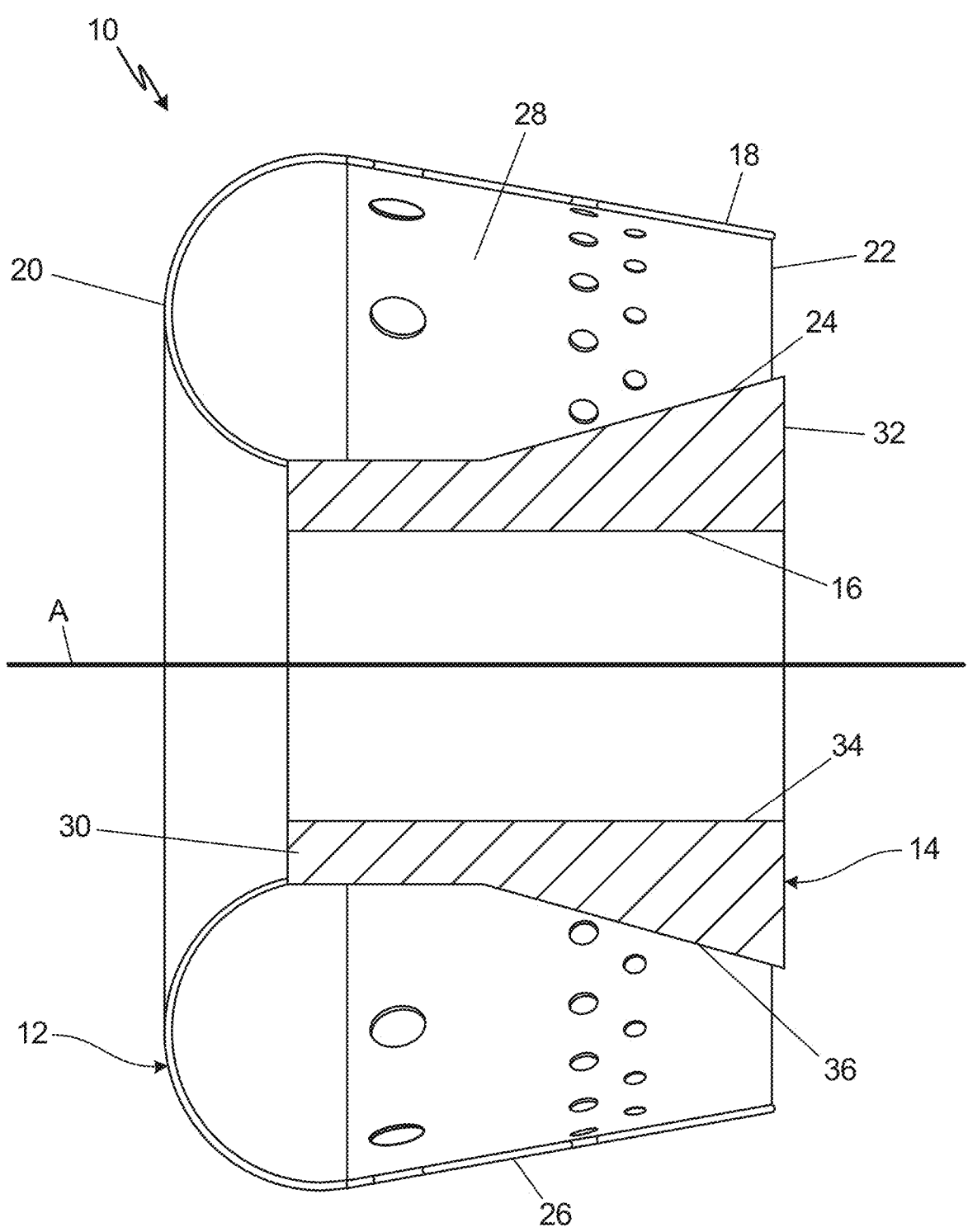
FIG. 1B is a schematic cross-sectional side view of the combustor liner showing the cooling ring.

FIG. 1A is a schematic cross-sectional side view of combustor liner 10 showing cooling ring 14 and exhaust duct E. FIG. 1B is a schematic cross-sectional side view of combustor liner 10 showing cooling ring 14. FIGS. 1A and 1B will be discussed together.

Combustor liner 10 includes body 12, cooling ring 14, inner liner wall 16, and outer liner wall 18. Body 12 includes forward end 20, aft end 22, inner wall 24, outer wall 26, and combustion chamber 28. Cooling ring 14 includes upstream end 30, downstream end 32, inner wall 34, and outer wall 36. Also shown in FIGS. 1A and 1B is axis A. Also shown in FIG. 1A is exhaust duct E and flow F.

Combustor liner 10 is an annular combustor liner disposed about axis A, which can be an engine axis of a gas turbine engine. In the embodiment shown in FIGS. 1A and 1B, combustor liner 10 is a single-wall liner. In alternate embodiments, combustor liner 10 can be any suitable liner. Combustor liner 10 has annular curved body 12. Cooling ring 14 is annular and concentric with body 12. Cooling ring 14 is connected to body 12 such that cooling ring 14 is radially inward from body 12 of combustor liner 10. Cooling ring 14 and body 12 can be integral, or a single piece, or cooling ring 14 can be a separate component that is attached to body 12 via rivets, brazing, or any other suitable connection. Cooling ring 14 can be made of any suitable metal or conductive material. Cooling ring 14 can be an additively manufactured part of combustor liner 10. For example, cooling ring 14 can be an additively manufactured part of combustor liner 10, cooling ring 14 being a part formed using laser powder bed fusion. Cooling ring 14 can also be an extruded, or cast, part of combustor liner 10. Inner liner wall 16 of combustor liner 10 is a radially inner wall of combustor liner 10. Inner liner wall 16 has an inner diameter that defines an inner diameter of combustor liner 10. Cooling ring 14 defines inner liner wall 16 of combustor liner 10. Outer liner wall 18 of combustor liner 10 is a radially outer wall of combustor liner 10. Outer liner wall 18 is radially outward from inner liner wall 16. Outer liner wall 18 has an outer diameter that defines an outer diameter of combustor liner 10.

Body 12 of combustor liner 10 is a curved body that has a closed forward end 20 and an open aft end 22. Forward end 20 of body 12 is domed and at forward end 20 of body 12. Forward end 20 of body 12 is an upstream end of combustor liner 10. Aft end 22 of body 12 is at a downstream end of body 12 opposite forward end 20 of body 12. Aft end 22 can be in fluid communication with a turbine section. Body 12 extends axially from forward end 20 to aft end 22, connecting inner wall 24 and outer wall 26 of body 12. Outer wall 26 of body 12 is radially outward from inner wall 24 of body 12. Inner wall 24 of body 12 defines an inner diameter of body 12. Outer wall 26 of body 12 defines an outer diameter of body 12. Outer wall 26 of body 12 also defines outer liner wall 18 and an outer diameter of combustor liner 10. Forward end 20 of body 12, inner wall 24 of body 12, and outer wall 26 of body 12 define combustion chamber 28 therebetween. As such, body 12 defines combustion chamber 28.

Cooling ring 14 has upstream end 30 at a first end of cooling ring 14 and downstream end 32 at a second end of cooling ring 14. Upstream end 30 of cooling ring 14 is open and adjacent forward end 20 of body 12. Downstream end 32 of cooling ring 14 is open and adjacent aft end 22 of body 12. Cooling ring 14 extends axially from upstream end 30 of cooling ring 14 to downstream end 32 of cooling ring 14.

Inner wall 34 of cooling ring 14 is radially inward from outer wall 36 of cooling ring. Inner wall 34 of cooling ring 14 defines an inner diameter of cooling ring 14. Inner wall 34 also defines inner liner wall 16 and an inner diameter of combustor liner 10. Inner wall 34 of cooling ring 14 is free-floating. Inner wall 34 of cooling ring 14 has an inner diameter sized to allow exhaust duct E to extend through inner wall 34 of cooling ring 14, as seen in FIG. 1A. As such, inner wall 34 of cooling ring 14 can be concentric with exhaust duct E and adjacent an outer surface of exhaust duct E. For example, a space gap of about 0.05 inch, or 0.127 centimeter, can exist between inner wall 34 of cooling ring 14 and the outer surface of exhaust duct E. Outer wall 36 of cooling ring 14 defines an outer diameter of cooling ring 14. Outer wall 36 of cooling ring 14 is connected to inner wall 24 of body 12 of combustor liner 10. Outer wall 36 of cooling ring 14 can be integral with inner wall 24 of body 12, or outer wall 36 of cooling ring 14 can be attached to inner wall 24 of body 12.

Cooling ring 14 can have any suitable shape. Cooling ring 14 increases the surface area at inner liner wall 16 of combustor liner 10. Outer wall 36 of cooling ring 14 follows the outline, or profile, of inner wall 24 of body 12. Inner wall 34 of cooling ring 14 can match the outline, or profile, of exhaust duct E. For example, as shown in FIGS. 1A and 1, outer wall 36 of cooling ring 14 can angle radially outward to follow the radially outward angle of inner wall 24 of body 12, and inner wall 34 can be straight from upstream end 30 to downstream end 32 of cooling ring 14. As such, the cross-sectional area of cooling ring 14 increases axially from upstream end 30 to downstream end 32 of cooling ring 14. In alternate embodiments, inner wall 24 of body 12 and outer wall 36 of cooling ring 14 can both be straight from upstream end 30 to downstream end 32 of cooling ring.

Combustor liner 10 is for a gas turbine engine. Combustor liner 10 receives high-pressure air from an upstream compressor section of the gas turbine engine and delivers combustion gases to a downstream turbine section of the gas turbine engine. As seen in FIG. 1A, flow F, which is the compressor discharge air, flows around outer liner wall 18, or an outer diameter, of combustor liner 10 and through the inner bore of combustor liner 10 formed by inner liner wall 16, or an inner diameter, of combustor liner 10. Flow F is burned with fuel within combustion chamber 28 of body 12. Flow F also flows through cooling ring 14 from upstream end 30 of cooling ring 14 to downstream end 32 of cooling ring 14. Flow F moves at a high velocity through cooling ring 14. Cooling ring 14 uses flow F to act as a heat exchanger, providing cooling to body 12 of combustor liner 10.

Combustor liner 10 is exposed to very high temperatures. For example, the temperatures within combustion chamber 28 of body 12 may be higher than the melting point of body 12 of combustor liner 10. Cooling ring 14 provides cooling for combustor liner 10 so that combustor liner 10 can withstand high temperatures. As a result, combustor liner 10 can operate in high temperature environments and maintain integrity. The position of combustor liner 10 also allows for radial thermal expansion.

Figure 2A:
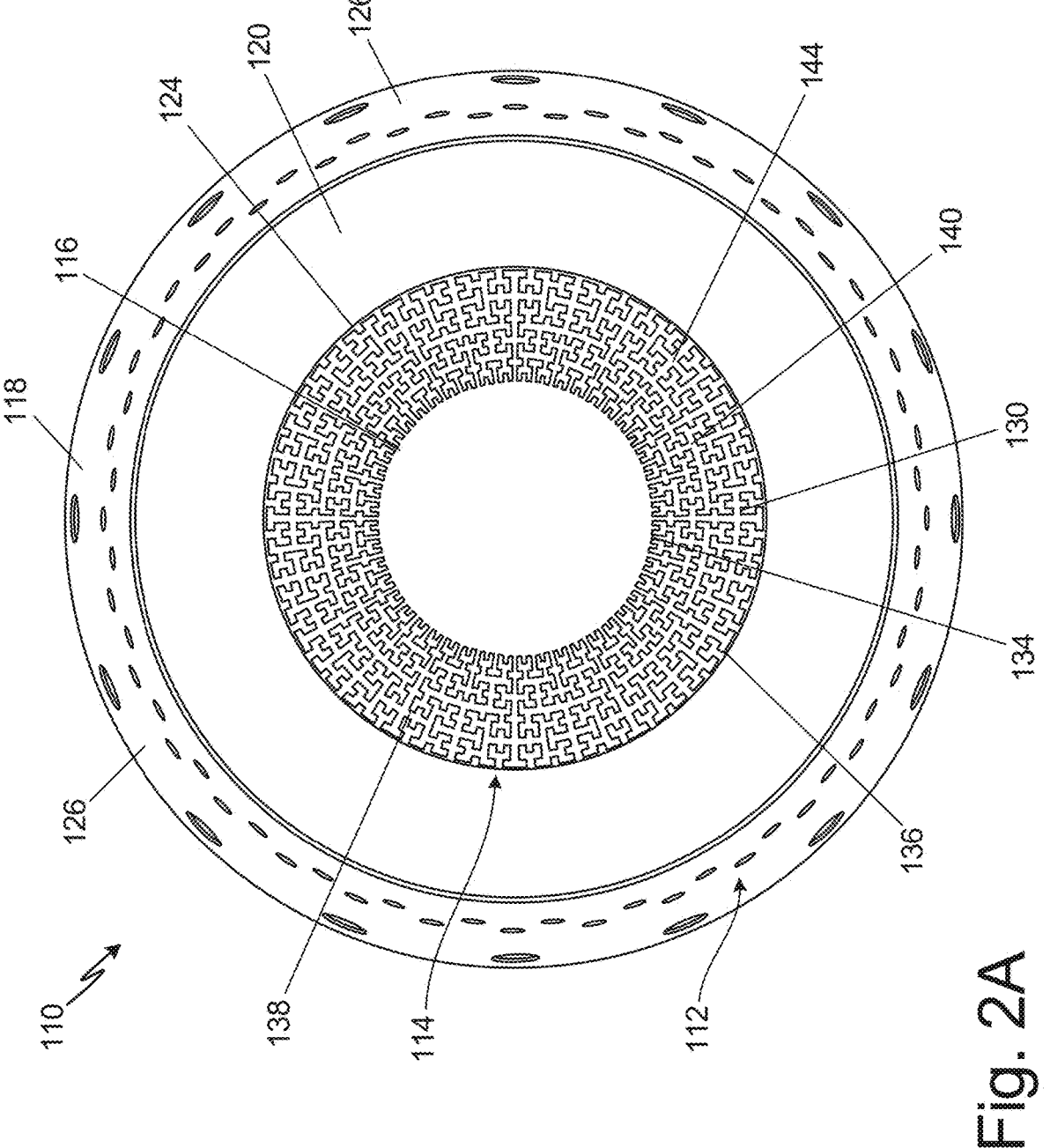
FIG. 2A is an end view of a combustor liner showing a second embodiment of a cooling ring.
Figure 2B:
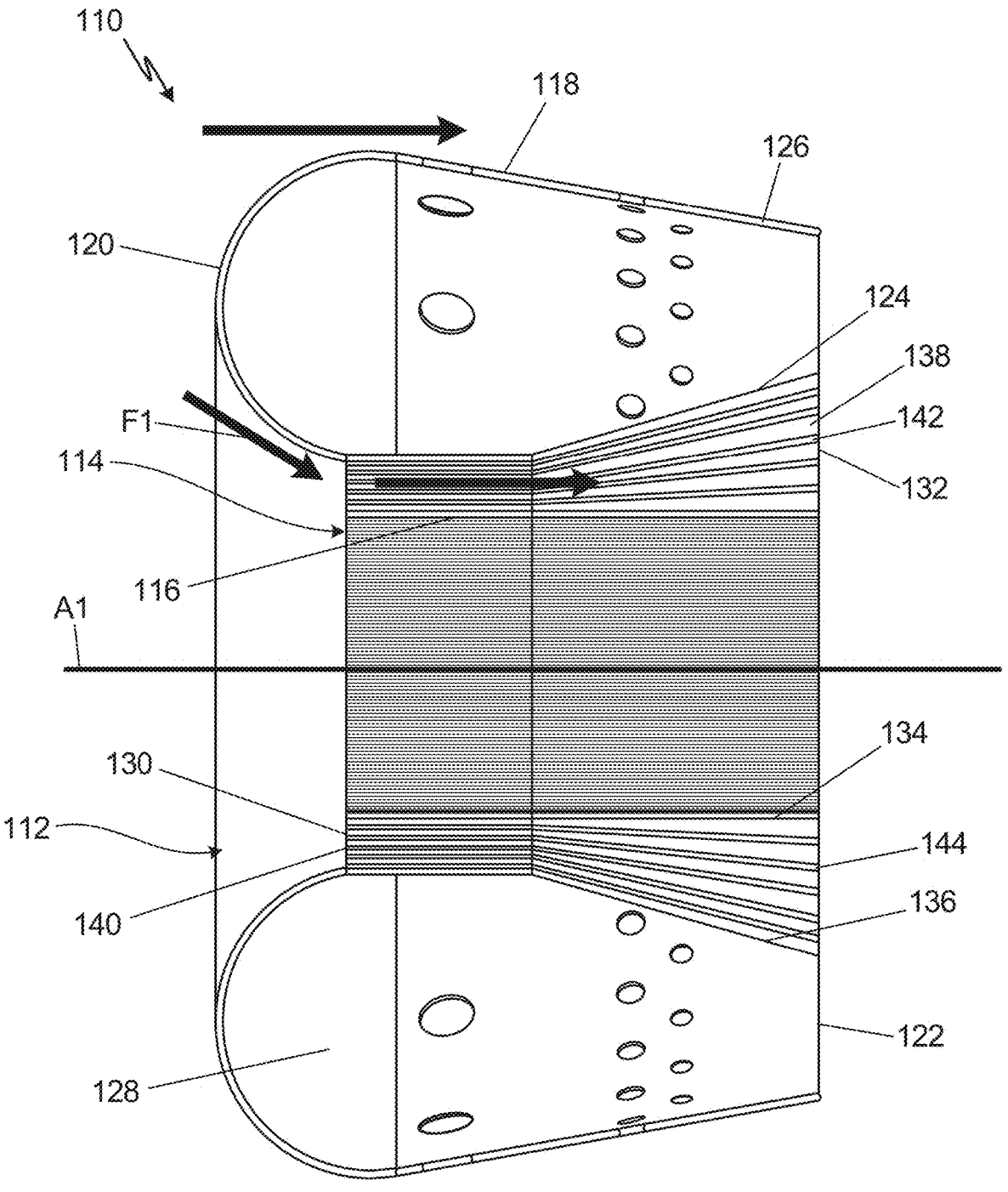
FIG. 2B is a cross-sectional side view of the combustor liner showing the second embodiment of the cooling ring.

FIG. 2A is an end view of combustor liner 110 showing cooling ring 114. FIG. 2B is a cross-sectional side view of combustor liner 110 showing cooling ring 114. FIGS. 2A and 2B will be discussed together.

Combustor liner 110 includes body 112, cooling ring 114, inner liner wall 116, and outer liner wall 118. Body 112 includes upstream end 120, downstream end 122 (shown in FIG. 2B), inner wall 124, outer wall 126, and combustion chamber 128 (shown in FIG. 2B). Cooling ring 114 includes upstream end 130, downstream end 132 (shown in FIG. 2B), inner wall 134, outer wall 136, fin 138, inlet 140, outlet 142 (shown in FIG. 2B), and channel 144. Also shown in FIG. 2B is axis A1 and flow F1.

Combustor liner 110 has the same structure and function as combustor liner 10 described with respect to FIGS. 1A and 1B. Combustor liner 110 has cooling ring 114 that additionally includes fin 138, inlet 140, outlet 142, and channel 144.

Cooling ring 114 is defined by fin 138. Fin 138 has a space filling curve. The space filling curve of fin 138 is a space filling curve that fills a unit square. As seen in FIG. 2A, the shape of space filling curve of fin 138 is visible at upstream end 130 of cooling ring 114. The shape of space filling curve of fin 138 is also visible at downstream end 132 of cooling ring 114. Fin 138 extends from upstream end 130 of cooling ring 114 to downstream end 132 of cooling ring 114. The space filling curve of fin 138 is modified such that outer wall 136 of cooling ring 114 matches a shape of inner wall 124 of body 112. In the example shown in FIGS. 2A and 2B, the space filling curve of fin 138 is a Hilbert curve that is modified so that outer wall 136 of cooling ring 114 matches the shape of inner wall 124 of body 112. The space filling curve of fin 138 is also modified to fit the annular shape of cooling ring 114.

Fin 138 forms inlet 140 at upstream end 130 of cooling ring 114 and outlet 142 at downstream end 132 of cooling ring 114 opposite inlet 140. As such, inner wall 134 of cooling ring 114 extends from inlet 140 to outlet 142, and outer wall 136 of cooling ring 114 extends from inlet 140 to outlet 142. The shape of the Hilbert curve of fin 138 defines the shape of inlet 140 of cooling ring 114 and the shape of outlet 142 of cooling ring 114. Fin 138 also defines inner wall 134 of cooling ring 114 and outer wall 116 of cooling ring 114. As seen in FIG. 2B, fin 138 defines and forms channel 144, which is a space that extends from inlet 140 of cooling ring 114 to outlet 142 of cooling ring 114. Because fin 138 is modified such that outer wall 136 of cooling ring 114 matches the shape of inner wall 124 of body 114, portions of channel 144 increase in diameter from upstream end 130 of cooling ring 114 to downstream end 132 of cooling ring 114. For example, portions of channel 144 increase in diameter toward downstream end 132, or outlet 142, of cooling ring 114. As seen in FIG. 2B, portions of channel 144 have a constant increase in diameter toward outlet 142 where inner wall 124 body 112 angles radially outward from axis A1.

Flow F1 of air moves from inlet 140 to outlet 142 of cooling ring 114. Because fin 138 has a space filling curve, flow F1 travels through cooling ring 114, moving in a single direction through channel 144, from inlet 140 to outlet 142. As flow F1 moves along fin 138, conduction occurs at fin 138, which is followed by convection, moving the heat away from body 112 of combustor liner 110 via fin 138 of cooling ring 114. The space filling curve of fin 138 increases the surface area of fin 138, maximizing the surface area of combustor liner 110. As a result, the amount of conduction that occurs via cooling ring 114 is increased, maximizing the heat exchange adjacent inner liner wall 116 of combustor liner 110. The space filing curve of fin 138 allows for such an increase in surface area while requiring only a small volume for cooling ring 114.

The heat exchange adjacent inner liner wall 116 of combustor liner 110 is maximized so that the cooling of combustor liner 110 is maximized. Enhancing cooling of combustor liner 110 increases the durability of combustor liner 110 and can enable higher operating temperatures. Because the space filling curve maximizes the surface area of cooling ring 114 while only requiring a small volume for cooling ring 114, the increase in volume of combustor liner 110 is minimized and the weight of combustor liner 110 is not appreciably increased when incorporating cooling ring 114. Further, cooling ring 114 provides inactive cooling for combustor liner 110, decreasing the complexity, cost, and risk associated with cooling combustor liner 110.

Utilizing additive manufacturing, such as laser powder bed fusion, to form cooling ring 114 allows for the complex, repeatable geometry of cooling ring 114 with fin 138 having a space filling curve without requiring additional support structure to build cooling ring 114. The increase in process time and powder usage required to make combustor liner 110 with cooling ring 114 versus combustor liner 110 without cooling ring 114 via laser powder bed fusion would be negligible, especially if cooling ring 114 and body 112 are integral. As such, manufacturing combustor liner 110 is cost effective.

Figure 3:
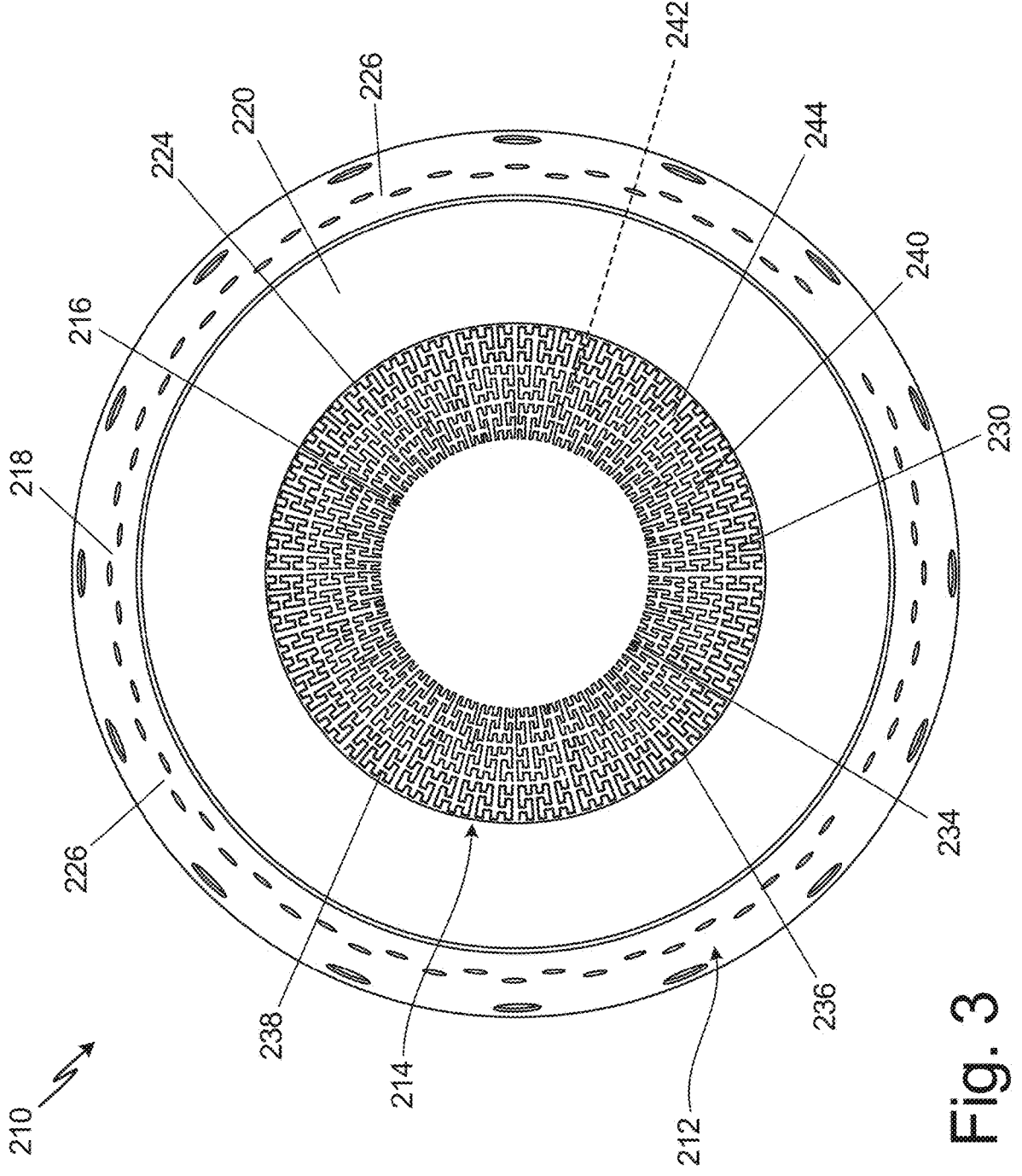
FIG. 3 is an end view of a combustor liner showing a third embodiment of a cooling ring.

FIG. 3 is an end view of combustor liner 210 showing cooling ring 214. Combustor liner 210 includes body 212, cooling ring 214, inner liner wall 216, and outer liner wall 218. Body 212 includes upstream end 220, inner wall 224, and outer wall 226. Cooling ring 214 includes upstream end 230, inner wall 234, outer wall 236, fin 238, inlet 240, outlet 242, and channel 244. Body 212 further includes a downstream end (not shown in FIG. 3)

Combustor liner 210 has the same structure and function as combustor liner 10 described with respect to FIGS. 1A and 1B. Combustor liner 210 has cooling ring 214 that additionally includes fin 238, inlet 240, outlet 242, and channel 244.

Cooling ring 214 is defined by fin 238. Fin 238 has a space filling curve. The space filling curve of fin 238 is a space filling curve that fills a unit square. As seen in FIG. 3, the shape of space filling curve of fin 238 is visible at upstream end 230 of cooling ring 214. The shape of space filling curve of fin 238 is also visible at a downstream end (not shown) of cooling ring 214. Fin 238 extends from upstream end 230 of cooling ring 214 to the downstream end of cooling ring 214. The space filling curve of fin 238 is modified such that outer wall 236 of cooling ring 214 matches a shape of inner wall 224 of body 212. In the example shown in FIG. 3, the space filling curve of fin 138 is a Peano curve that is modified so that outer wall 236 of cooling ring 114 matches the shape of inner wall 224 of body 212. The space filling curve of fin 238 is also modified to fit the annular shape of cooling ring 214.

Fin 238 forms inlet 240 at upstream end 230 of cooling ring 214 and outlet 242 at the downstream end of cooling ring 214 opposite inlet 240. Outlet 242 is the same as outlet 142 described with respect to FIGS. 2A and 2B except that outlet 142 has the shape of a Peano curve. As such, inner wall 234 of cooling ring 214 extends from inlet 240 to outlet 242, and outer wall 236 of cooling ring 214 extends from inlet 240 to outlet 242. The shape of the Peano curve of fin 238 defines the shape of inlet 240 of cooling ring 214 and the shape of outlet 242 of cooling ring 214. Fin 238 also defines inner wall 234 of cooling ring 214 and outer wall 216 of cooling ring 214. Fin 238 defines and forms channel 244, which is a space that extends from inlet 240 of cooling ring 214 to outlet 242 of cooling ring 214. Because fin 238 is modified such that outer wall 236 of cooling ring 214 matches the shape of inner wall 224 of body 214, portions of channel 244 increase in diameter from upstream end 230 of cooling ring 214 to the downstream end (not shown) of cooling ring 214. For example, portions of channel 244 increase in diameter toward the downstream end, or outlet 242, of cooling ring 214. Portions of channel 244 can have a constant increase in diameter toward outlet 242 where inner wall 224 body 212 angles radially outward from an axis (not shown) that extends axially through the center of combustor liner 210.

Airflow moves from inlet 240 to outlet 242 of cooling ring 214. Because fin 238 has a space filling curve, airflow travels through cooling ring 214, moving in a single direction through channel 244, from inlet 240 to outlet 242. As airflow moves along fin 238, conduction occurs at fin 238, which is followed by convection, moving the heat away from body 212 of combustor liner 210 via fin 238 of cooling ring 214. The space filling curve of fin 238 increases the surface area of fin 238, maximizing the surface area of combustor liner 210. As a result, the amount of conduction that occurs via cooling ring 214 is increased, maximizing the heat exchange adjacent inner liner wall 216 of combustor liner 210. The space filing curve of fin 238 allows for such an increase in surface area while requiring only a small volume for cooling ring 214.

The heat exchange adjacent inner liner wall 216 of combustor liner 210 is maximized so that the cooling of combustor liner 210 is maximized. Enhancing cooling of combustor liner 210 increases the durability of combustor liner 210 and can enable higher operating temperatures. Because the space filling curve maximizes the surface area of cooling ring 214 while only requiring a small volume for cooling ring 214, the increase in volume of combustor liner 210 is minimized and the weight of combustor liner 210 is not appreciably increased when incorporating cooling ring 214. Further, cooling ring 214 provides inactive cooling for combustor liner 210, decreasing the complexity, cost, and risk associated with cooling combustor liner 210.

Utilizing additive manufacturing, such as laser powder bed fusion, to form cooling ring 214 allows for the complex, repeatable geometry of cooling ring 214 with fin 238 having a space filling curve without requiring additional support structure to build cooling ring 214. The increase in process time and powder usage required to make combustor liner 210 with cooling ring 214 versus combustor liner 210 without cooling ring 214 via laser powder bed fusion would be negligible, especially if cooling ring 214 and body 212 are integral. As such, manufacturing combustor liner 110 is cost effective.

Discussion of Possible Embodiments

The following are non-exclusive descriptions of possible embodiments of the present invention.

A combustor liner for a gas turbine engine, the combustor liner defining a combustion chamber, includes a curved body comprising: a closed forward end; an open aft end opposite the forward end; an inner wall, and an outer wall radially outward from the inner wall, the outer wall defining an outer liner wall of the combustor liner; and a cooling ring comprising a fin that has a space filling curve that is modified such that an outer wall of the cooling ring matches a shape of the inner wall of the curved body, wherein an inner wall of the cooling ring defines an inner liner wall of the combustor liner.

The combustor liner of the preceding paragraph can optionally include, additionally and/or alternatively, any one or more of the following features, configurations and/or additional components:

The cooling ring has an inlet at an upstream end of the cooling ring and an outlet at a downstream end of the cooling ring.

The cooling ring comprises a channel formed by the fin, the channel extending from the inlet of the cooling ring to the outlet of the cooling ring.

The inner wall of the curved body has a radially outward angle.

A portion of the channel increases in diameter toward the outlet of the cooling ring.

The inner wall of the cooling ring is free-floating.

The inner wall of the cooling ring is configured to be concentric with an exhaust duct.

The cooling ring and the curved body are integral.

The outer wall of the cooling ring is attached to the inner wall of the curved body.

The space filling curve is a Hilbert curve.

The space filling curve is a Peano curve.

The cooling ring is an extruded part of the combustor liner.

The cooling ring is an additively manufactured part of the combustor liner.

The cooling ring is formed using laser powder bed fusion.

The space filling curve of the fin is modified to fit an annular shape of the cooling ring.

A combustor liner for a gas turbine engine, the combustor liner defining a combustion chamber, includes a body defining a combustion chamber, the body comprising: an inner wall; and an outer wall radially outward from the inner wall; and a cooling ring comprising: a fin; an inlet formed by the fin at an upstream end of the cooling ring; an outlet formed by the fin at a downstream end of the cooling ring opposite the inlet; a channel formed by the fin and extending from the inlet of the cooling ring to the outlet of the cooling ring; an outer wall extending from the inlet to the outlet; and an inner wall radially inward from the outer wall and extending from the inlet to the outlet; wherein the outer wall of the cooling ring matches a shape of the inner wall of the body; and wherein the inner wall of the cooling ring defines an inner liner wall of the combustor liner.

The combustor liner of the preceding paragraph can optionally include, additionally and/or alternatively, any one or more of the following features, configurations and/or additional components:

The fin has a Hilbert curve or a Peano curve, the Hilbert curve or the Peano curve being modified such that the outer wall of the cooling ring matches a shape of the inner wall of the body.

A portion of the channel increases in diameter toward the outlet of the cooling ring.

The inner wall of the cooling ring is free-floating.

The cooling ring and the curved body are integral.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A combustor liner for a gas turbine engine, the combustor liner defining a combustion chamber and comprising:

a curved body comprising:
   a closed forward end;
   an open aft end opposite the forward end;
   an inner wall, and
   an outer wall radially outward from the inner wall, the outer wall defining an outer liner wall of the combustor liner; and
a cooling ring comprising a fin that has a space filling curve that is modified such that an outer wall of the cooling ring matches a shape of the inner wall of the curved body, wherein an inner wall of the cooling ring defines an inner liner wall of the combustor liner and wherein the space filling curve is a Hilbert curve or a Peano curve.

2. The combustor liner of claim 1, wherein the cooling ring has an inlet at an upstream end of the cooling ring and an outlet at a downstream end of the cooling ring.

3. The combustor liner of claim 2, wherein the cooling ring comprises a channel formed by the fin, the channel extending from the inlet of the cooling ring to the outlet of the cooling ring.

4. The combustor liner of claim 3 wherein the inner wall of the curved body has a radially outward angle.

5. The combustor liner of claim 4, wherein a portion of the channel increases in diameter toward the outlet of the cooling ring.

6. The combustor liner of claim 1, wherein the inner wall of the cooling ring is configured to be concentric with an exhaust duct.

7. The combustor liner of claim 6, wherein the inner wall of the cooling ring has an inner diameter sized to allow the exhaust duct to extend through the inner wall of the cooling ring with a space gap between the inner wall of the cooling ring and an outer surface of the exhaust duct.

8. The combustor liner of claim 1, wherein the cooling ring and the curved body are integral.

9. The combustor liner of claim 1, wherein the outer wall of the cooling ring is attached to the inner wall of the curved body.

10. The combustor liner of claim 1, wherein the cooling ring is an extruded part of the combustor liner.

11. The combustor liner of claim 1, wherein the cooling ring is an additively manufactured part of the combustor liner.

12. The combustor liner of claim 11, wherein the cooling ring is formed using laser powder bed fusion.

13. The combustor liner of claim 1, wherein the space filling curve of the fin is modified to fit an annular shape of the cooling ring.

14. A combustor liner for a gas turbine engine, the combustor liner defining a combustion chamber, the combustor liner comprising:
   a body defining a combustion chamber, the body comprising:
      an inner wall; and
      an outer wall radially outward from the inner wall; and
   a cooling ring comprising:
      a fin, wherein the fin has a Hilbert curve or a Peano curve;
      an inlet formed by the fin at an upstream end of the cooling ring;
      an outlet formed by the fin at a downstream end of the cooling ring opposite the inlet;
      a channel formed by the fin and extending from the inlet of the cooling ring to the outlet of the cooling ring;
      an outer wall extending from the inlet to the outlet; and an inner wall radially inward from the outer wall and extending from the inlet to the outlet;

wherein the outer wall of the cooling ring matches a shape of the inner wall of the body; and wherein the inner wall of the cooling ring defines an inner liner wall of the combustor liner.

15. The combustor liner of claim 14, wherein the Hilbert curve or the Peano curve is modified such that the outer wall of the cooling ring matches a shape of the inner wall of the body.

16. The combustor liner of claim 15, wherein a portion of the channel increases in diameter toward the outlet of the cooling ring.

17. The combustor liner of claim 14, wherein the inner wall of the cooling ring has an inner diameter sized to allow an exhaust duct to extend through the inner wall of the cooling ring with a space gap between the inner wall of the cooling ring and an outer surface of the exhaust duct.

18. The combustor liner of claim 14, wherein the cooling ring and the curved body are integral.

* * * * *